United States Patent [19]

Thies

[11] Patent Number: 5,596,148
[45] Date of Patent: Jan. 21, 1997

[54] PRESSURE DIFFERENCE MEASUREMENT TRANSDUCER WITH ELECTRIC LEAD-THROUGH IN BORE PARALLEL TO HOUSING LONGITUDINAL AXIS

[75] Inventor: Werner Thies, Karlsruhe, Germany

[73] Assignee: Siemens Aktiengesellschaft, Munich, Germany

[21] Appl. No.: 525,635

[22] PCT Filed: Mar. 9, 1994

[86] PCT No.: PCT/DE94/00262

§ 371 Date: Nov. 28, 1995

§ 102(e) Date: Nov. 28, 1995

[87] PCT Pub. No.: WO94/21992

PCT Pub. Date: Sep. 29, 1994

[30] Foreign Application Priority Data

Mar. 15, 1993 [DE] Germany ............ 43 08 718.3

[51] Int. Cl.[6] ............................ G01L 9/04; G01L 7/08
[52] U.S. Cl. ............................ 73/720; 73/721; 73/717
[58] Field of Search ............................ 73/706, 720, 721, 73/717, 718, 719, 722

[56] References Cited

U.S. PATENT DOCUMENTS

| | | | |
|---|---|---|---|
| 3,691,842 | 9/1972 | Akeley | 73/398 |
| 3,780,588 | 12/1973 | Whitehead, Jr. et al. | 73/398 |
| 4,135,408 | 1/1979 | DiGiovanni | 73/721 |
| 4,766,769 | 8/1988 | Nudd, Jr. et al. | 73/706 |
| 4,798,089 | 1/1989 | Frick et al. | 73/706 |

FOREIGN PATENT DOCUMENTS

| | | |
|---|---|---|
| 0405633 | 1/1991 | European Pat. Off. . |
| 2712846 | 11/1977 | Germany . |
| 3047619 | 9/1985 | Germany . |
| 3437668 | 4/1986 | Germany . |
| 3500613 | 9/1986 | Germany . |
| 1228401 | 4/1971 | United Kingdom . |
| 2124770 | 2/1994 | United Kingdom . |

OTHER PUBLICATIONS

TM TECHNISCHES MESSEN, vol. 56, No. 11, Nov. 1989, München, DE, pp. 415–417, O. Ehrmann et al.: *Tape Automated Bonding for Sensors*.

G. Ehrler, Siemens AG, München, DE: *Piezoresistive Silizium–Elementardrucksensoren*, AMA–Seminar Mikrotechnik, Heidelberg, Mar. 14–15, 1989, pp. 81–95.

*Primary Examiner*—Richard Chilcot
*Assistant Examiner*—Joseph L. Felber
*Attorney, Agent, or Firm*—Kenyon & Kenyon

[57] ABSTRACT

A pressure difference measurement transducer with an inner housing divided into two parts transversely to its longitudinal axis has a central diaphragm bearing a pressure sensor clamped between the two housing sections. One housing section contains an electric lead-through in a bore, an external extension of which lies in an enlarged part of the bore. To simplify the electric lead-through in the manufacture of such a measurement transducer, the bore is arranged parallel to the longitudinal axis of the measurement transducer. At its end towards the other housing section the bore has an enlarged section and at its end away from the other housing section it becomes an outwardly directed transverse bore.

2 Claims, 2 Drawing Sheets

PRESSURE DIFFERENCE MEASUREMENT TRANSDUCER WITH ELECTRIC LEAD-THROUGH IN BORE PARALLEL TO HOUSING LONGITUDINAL AXIS

BACKGROUND OF THE INVENTION

The present invention relates to a pressure difference measurement transducers in general and more particularly to an improved transducer of this type which permits easier assembly.

A pressure difference transducer of the type with an inner housing divided into two parts transversely to its longitudinal axis, between the two housing sections of which is clamped a central diaphragm bearing a pressure sensor and whose one housing section contains an electric lead-through in a bore, an external extension of which lies in an enlarged part of the bore is known in the art.

For example, in the pressure difference measurement transducer disclosed in U.S. Pat. No. 4,135,408, the bore containing the electric lead-through runs transversely to the longitudinal axis of the measurement transducer from the outside to the inside. The bore is enlarged towards the outside so that the an external extension of the electric lead-through can be pressed against an internal shoulder. Between the external extension and the shoulder, an O-ring is laid in order to make a reliable seal to the outside. Since, in this known pressure difference measurement transducer, the full static pressure in the inside of the measurement transducer acts upon the electric lead-through, a solid screw is screwed within the bore against the external extension of the electric lead-through.

Another measuring device for pressure measurement, this one with an electric lead-through housed in a bore parallel to the longitudinal axis of the measurement transducer is described DE 34 37 668 A1. An external extension of the lead-through lies in an enlarged part of the bore toward the pressure loading, which in turn, on its side away from the pressure loading, becomes an outwardly directed transverse bore. No sensor is arranged on the central diaphragm in this measuring device. Instead, a pressure and a pressure difference sensor are fastened parallel to the longitudinal axis of the measurement transducer side-by-side in an inner housing section such that their electrical terminals lie side-by-side in a plane. The electrical terminals of the sensors are connected, in each case, by means of a conductor strip, to an electric lead-through also lying axially parallel next to the sensors.

DE 35 00 613 A1 discloses connecting the bonding wires of a piezoresistive pressure measurement cell directly to the supply lines on a plastic foil material section. However, in this reference, the teaching is not directed to connecting an off the shelf pressure sensor provided with a bonding plate and a housing to an electric lead-through in a simple manner.

Thus, a need still exists to provide a pressure difference measurement transducer which can be manufactured in a relatively simple manner in terms of the arrangement of the electric lead-through.

SUMMARY OF THE INVENTION

This need is satisfied in a pressure difference measurement transducer of the general type described above in which the bore runs parallel to the longitudinal axis and has at its end towards the other housing section an enlarged section. At its end away from the other housing section, the bore becomes an outwardly directed transverse bore. A ribbon-like conductor foil which is led through an angular bend next to the pressure sensor close to the central diaphragm and forms a loop in the area of the electric lead-through runs between the pressure sensor and the electric lead-through.

One advantage of the pressure difference measurement transducer according to the present invention resides in the fact that, despite the mounting of the pressure sensor on the central diaphragm, through the arrangement of the bore and its form, the electric lead-through with its external extension is pressed by the static internal pressure against an extension formed by the enlarged part of the bore, as a result of which the pressure loading of the electric lead-through due to the static internal pressure is supported by the one homing section. A solid screwing to support the static pressure exerted on the electric lead-through is thus not necessary in the pressure difference measurement transducer according to the present invention. Here, through the loop of the ribbon-like conductor foil, the ribbon-like conductor foil can following its galvanic connection with the pressure sensor, easily also be soldered to the electrical terminals of the electric lead-through since the accessibility of this soldering location is ensured particularly well through an opening of the loop.

The arrangement of the bore containing the electric lead-through and the mounting of the electric lead-through itself make it possible in the pressure difference measurement transducer according to the present invention to weld the electric lead-through in the area of its external extension with the one housing section in an advantageous manner. Here, the welding joint serves only to seal the inner space of the pressure difference measurement transducer according to the present invention to the outside; the welding joint is not subjected to pressure loads so that it does not have to meet high quality requirements.

A further advantage of the pressure difference measurement transducer according to the present invention is seen in that, through an angular bend next to the pressure sensor, it is easy to exclude influences on the freedom of movement of the central diaphragm or more specifically of the pressure sensor arranged on it.

DETAILED DESCRIPTION

Figure 1:
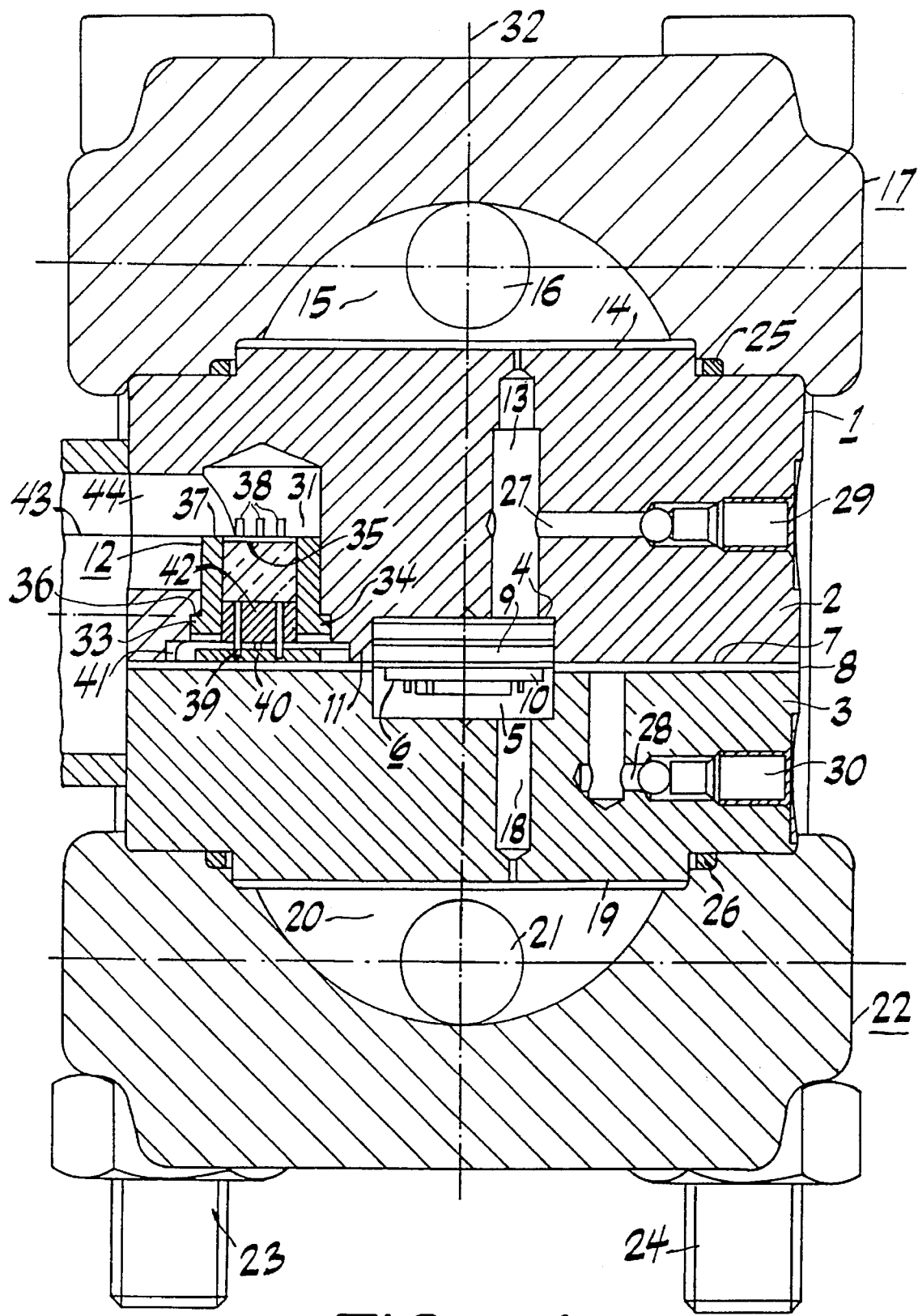
FIG. 1 is a longitudinal section through an embodiment of the pressure difference measurement transducer according to the present invention.

The pressure difference measurement transducer shown in FIG. 1 has an inner housing 1, which contains one housing section 2 and another housing section 3 with housing section 2 shown above housing section 3 in FIG. 1. The one housing section 2 has a central recess 4; the other housing section 3 is also provided with a further central recess 5. In the cavity formed by the central recesses 4 and 5, a pressure sensor 6 which is fastened to a central diaphragm 7 is located. The central diaphragm 7 is clamped between the housing sections 2 and 3 of the inner housing 1 on the outer edge 8 in known manner through welding.

The pressure sensor 6 can, for example, be designed in detail as described in the publication by G. Ehrler "Piezoresistive Silizium-Elementardmcksensoren" [Piezoresistive silicon elementary pressure sensors], AMA Seminar Micromechanics, Heidelberg, Mar. 14–15, 1989, pp. 81–95. The pressure sensor consists of a sensor element 9 known in this respect, and is arranged on a bonding plate 10 in a likewise known manner. Its electrical terminals are—as will be explained in detail later in conjunction with FIG. 2—connected via a ribbon-like conductor foil 11 to an electric lead-through 12.

The central recess 4 of the one housing section 2 is joined in a pressure conductive manner, through an internal channel 13 and a separating diaphragm 14 with a pre-chamber 15 to which a pressure is fed via an opening 16 in a known manner. The pre-chamber 15 is formed by a recess in an outer housing cap 17.

Analogously, the further central recess 5 of the other housing section 3 is joined in a pressure conductive manner through a further internal channel 18 and a further separating diaphragm 19 with a further pre-chamber 20 into which a further pressure is introduced via an opening 21. The pre-chamber 20 is formed by a further housing cap 22, which is braced by means of clamping bolts 23 and 24 to the other housing cap 17 with interlaid O-rings 25 and 26.

Within the internal channels 13 and 18 of the two housing sections 2 and 3, oil is contained in a known manner. The oil is supplied through channels 27 and 28 in a known manner; these channels 27 and 28 are subsequently sealed tight by the sealing devices 29 and 30, only shown schematically.

As can also be seen in FIG. 1, the one housing section 2 has a bore 31 parallel to the longitudinal axis 32 of the pressure difference measurement transducer. At its end towards the other housing section 3, this bore 31 is provided with a widened section 33. The electric lead-through 12 has a corresponding extension 34 on an external metal cylinder 35 of the electric lead-through 12. The external extension 34 of the electric lead-through 12 is pressed against a shoulder 36, which is formed by the expanded section 33.

The electric lead-through 12 contains electric contact pins 38 embedded in a glass member 37 which stick out on both sides from the electric lead-through 12. Thus, it is possible to connect the ends 39 of the contact pins 38 extending downwardly in FIG. 1 to the ribbon-like conductor foil 11, which, following an angular bend, runs in a plane parallel to the central diaphragm 7 and forms a loop 41 about a ceramic body 40, in order to be soldered to the contact pins 38 with its end which is led back in the direction of the pressure sensor 6. A further ceramic piece 42 is, incidentally, slid beforehand over the ends 39 of the contact pins 38. On their top ends in FIG. 1, the contact pins 38 are likewise connected through soldering to the conducting leads on a further ribbon-like conductor foil 43. This further ribbon-like conductor foil is fed outside through a transverse bore 44, which extends all the way to the bore 31.

In the pressure difference measurement transducer shown in FIG. 1, the space below the electric lead-through 12 has applied to it the static pressure which therefore also acts on the electric lead-through 12. The load placed on the electric lead-through 12 in this manner is transferred via the external extension 34 to the one housing section 2 so that only a simple weld seam in the area of the external extension is needed to obtain sealing of the inner space of the pressure difference measurement transducer to the outside. Further measures for supporting the static pressure in the area of the electrode lead-through are not necessary.

Figure 2:
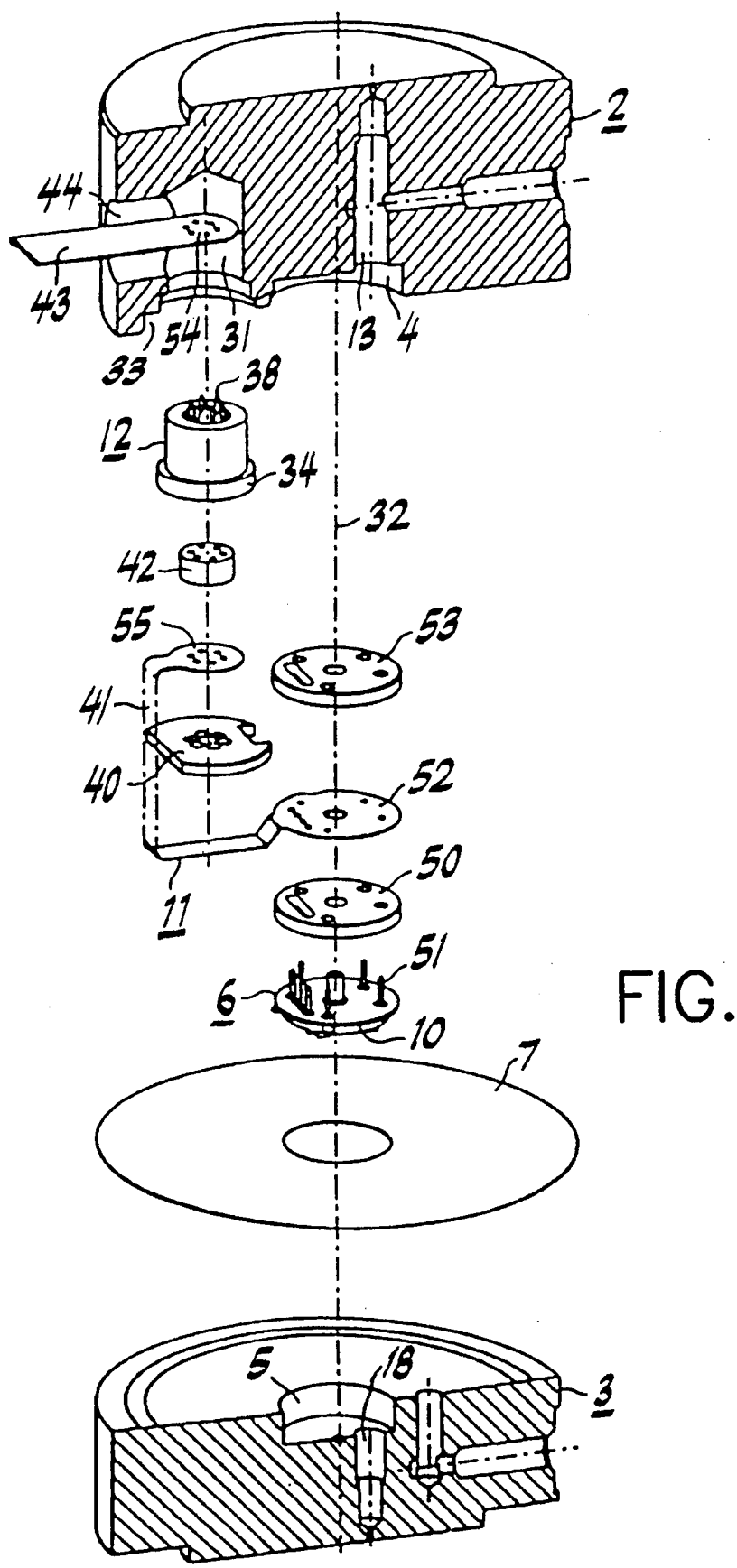
FIG. 2 is a blow-up drawing of the area of the housing sections of the inner housing of the pressure difference measurement transducer according to FIG. 1.

From FIG. 2, in which parts corresponding to FIG. 1 are labeled with the same reference numbers, it can be seen that the pressure sensor 6 is joined to the central diaphragm 7 after the pressure sensor 6 has already been provided with a bonding plate 10. To insulate the pressure sensor 6, which is generally provided with a metal housing, from the ribbon-like conductor foil 11, a ceramic plate 50 which has openings corresponding to the arrangement of the electral terminal pins 51 of the pressure sensor 6 is used.

After the soldering of the ribbon-like conductor foil 11 in its area 52 to the terminal pins 51 of the pressure sensor 6, a ceramic cover plate 53 is applied in order to achieve insulation of the pressure sensor 6 during strong deflections of the central diaphragm 7 with respect to the one housing section 2.

On the other hand, prior to a further joining of the housing sections 2 and 3 of the inner housing 1, the electric lead-through 12 is mounted in the bore 31 of the one housing section 2, and the contact pins 38 are soldered to the end 54 of the further conductor foil 43. Subsequently, the further ceramic piece 42 is slid on to the ends 39, not recognizable in FIG. 2, of the contact pins 38 of the electric lead-through 12 and afterwards, a soldering of the other end 55 of the one ribbon-like conductor foil 11 is carded out. Here, the installation is carded out such that the loop 41 of the ribbon-like conductor foil 11 is formed about the ceramic plate 40; in this process the plate 40 serves to prevent a bending in the ribbon-like conductor foil 11 in the area of the loop.

Once the assembly has proceeded to this point, the housing sections 2 and 3 of the inner housing can be joined through welding while clamping the central diaphragm 7 to the pressure sensor 6.

I claim:

1. A pressure difference measurement transducer comprising:

a. an inner housing divided into two housing sections transversely to its longitudinal axis;

b. a central diaphragm bearing a pressure sensor, the central diaphragm being clamped between the two housing sections;

c. a first bore running parallel to said longitudinal axis in one housing section having an enlarged section at the end of said bore toward the other housing section;

d. an electric lead-through having an external extension disposed in said bore with said external extension in said enlarged section of said bore;

e. an outwardly directed transverse second bore at the end of said first bore away from the other housing section; and f. a ribbon-like conductor foil running between said pressure sensor and said electric lead-through, said ribbon-like conductor foil led through an angular bend next to said pressure sensor close to said central diaphragm, and said ribbon-like conductor foil forming a loop in the area of said electric lead-through.

2. The pressure difference measurement transducer according to claim 1, wherein said electric lead-through is welded to said one housing section in the area of its external extension.

\* \* \* \* \*